United States Patent

Cheon et al.

(10) Patent No.: US 10,171,114 B2
(45) Date of Patent: Jan. 1, 2019

(54) RADIO FREQUENCY SWITCH APPARATUS HAVING IMPROVED NOISE SUPPRESSION CHARACTERISTICS

(71) Applicant: SAMSUNG ELECTRO-MECHANICS CO., LTD., Suwon-si (KR)

(72) Inventors: Seong Jong Cheon, Suwon-si (KR); Sung Jae Yoon, Suwon-si (KR); Hyun Jin Yoo, Suwon-si (KR); Se Jong Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/678,444

(22) Filed: Aug. 16, 2017

(65) Prior Publication Data

US 2018/0145707 A1 May 24, 2018

(30) Foreign Application Priority Data

Nov. 18, 2016 (KR) .................. 10-2016-0154229

(51) Int. Cl.
*H04B 1/04* (2006.01)
*H04B 1/00* (2006.01)
*H04B 1/16* (2006.01)

(52) U.S. Cl.
CPC .......... *H04B 1/0475* (2013.01); *H04B 1/006* (2013.01); *H04B 1/0057* (2013.01); *H04B 1/163* (2013.01)

(58) Field of Classification Search
CPC . H03H 11/24; H03H 7/40; H03H 7/46; H04B 1/48; H04B 1/006; H04B 1/0475; H04B 1/0057; H04B 2001/1054; H04B 7/0602; H04B 1/0053; H04B 1/0067; H04B 1/163; H01P 1/10
See application file for complete search history.

(56) References Cited

U.S. PATENT DOCUMENTS

| | | | | |
|---|---|---|---|---|
| 5,789,995 A * | 8/1998 | Minasi | ...................... | H04B 1/48 333/103 |
| 8,649,418 B1 * | 2/2014 | Negus | .................. | H04B 7/0486 375/211 |
| 2007/0123175 A1 | 5/2007 | Watanabe et al. | | |
| 2013/0241666 A1 * | 9/2013 | Granger-Jones | .......... | H01P 1/15 333/101 |

(Continued)

FOREIGN PATENT DOCUMENTS

| | | |
|---|---|---|
| JP | 1996-148901 A | 6/1996 |
| JP | 2003-198418 A | 7/2003 |

(Continued)

*Primary Examiner* — Khanh C Tran
(74) *Attorney, Agent, or Firm* — NSIP Law

(57) ABSTRACT

A radio frequency switch apparatus includes switching circuits connected between respective signal terminals and an antenna terminal. Each of the switching circuits includes a series switching circuit and a shunt switching circuit configured to switch a signal band on and off. An inductor circuit includes an inductor device connected between at least one shunt switching circuit of the switching circuits and a ground. The inductor device suppresses noise and passes the signal band by being resonant with a capacitance present upon the shunt switching circuit being turned off.

15 Claims, 5 Drawing Sheets

(56) References Cited

U.S. PATENT DOCUMENTS

| | | | | |
|---|---|---|---|---|
| 2014/0009208 A1* | 1/2014 | Smith | ................ | H04B 1/0458 |
| | | | | 327/391 |
| 2015/0147980 A1* | 5/2015 | Larsen | ................ | H01Q 5/314 |
| | | | | 455/77 |
| 2015/0318889 A1* | 11/2015 | Lee | ................ | H04B 1/44 |
| | | | | 455/78 |
| 2016/0093948 A1* | 3/2016 | Lehtola | ................ | H01Q 5/321 |
| | | | | 343/852 |
| 2017/0301993 A1* | 10/2017 | Hung | ................ | H01Q 5/335 |
| 2017/0310319 A1* | 10/2017 | Hayakawa | ................ | H03K 17/56 |
| 2018/0123619 A1* | 5/2018 | Bradley | ................ | H04B 1/0057 |
| 2018/0167064 A1* | 6/2018 | Shapiro | ................ | H03K 17/161 |

FOREIGN PATENT DOCUMENTS

| | | |
|---|---|---|
| KR | 10-0638879 B1 | 10/2006 |
| KR | 10-0845491 B1 | 7/2008 |

\* cited by examiner

RADIO FREQUENCY SWITCH APPARATUS HAVING IMPROVED NOISE SUPPRESSION CHARACTERISTICS

CROSS-REFERENCE TO RELATED APPLICATION

This application claims the benefit of priority under 35 USC 119(a) of Korean Patent Application No. 10-2016-0154229, filed on Nov. 18, 2016 in the Korean Intellectual Property Office, the entire disclosure of which is incorporated herein by reference for all purposes.

BACKGROUND

1. Field

The following description relates to a radio frequency switch apparatus having improved characteristics for the suppression of noise.

2. Description of Related Art

As the use of carrier aggregation (CA) in wireless communications systems has expanded, harmonic attenuation performance of duplexers used in wireless communications systems has also improved. In detail, attenuation characteristics of a second harmonic or a third harmonic in a band used in a low frequency band (in a range of 600 MHz to 1000 MHz) have been considered significant.

A technical method of some communications system is to add harmonic suppression performance to a duplexer connected to a rear end portion of an antenna switch module (ASM), in order to secure harmonic attenuation characteristics.

However, since high-level isolation performance in a duplexer is required, it is difficult to simultaneously satisfy isolation performance and secure harmonic attenuation characteristics.

Another method of suppressing a harmonic, of some communications system, is to add a band stop resonant circuit to a transmission matching path of a duplexer.

A resonant circuit applied in the case described above may be implemented as a parallel connection resonant circuit or a series connection shunt resonant circuit. Since each of a parallel connection resonant circuit and a series connection shunt resonant circuit requires two or more resonant devices including an inductor and a capacitor, there is a problem in which additional space is necessary and a unit cost is increased.

Another technical method of some communications system is to, may be, allow low pass filters for harmonic attenuation to be disposed between an antenna switch module (ASM) and an antenna terminal. However, as even bands not requiring harmonic attenuation are attenuated, there is a problem in which degradation in insertion loss may occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide a radio frequency switch apparatus having improved characteristics for the suppression of noise, implementing a resonant circuit to suppress a harmonic by adding only an inductor thereto, since the radio frequency switch apparatus uses capacitance of a switch device that is turned off.

In one general aspect, a radio frequency switch apparatus comprises a first switching circuit connected between an antenna terminal and a first signal terminal. The first switching circuit comprises a first series switching circuit and a first shunt switching circuit configured to switch a first signal band on and off. A second switching circuit connected between the antenna terminal and a second signal terminal, is configured to switch a second signal band, different from the first signal band, on and off. An inductor circuit comprising a first inductor device is connected between the first shunt switching circuit and a ground. The first inductor device suppresses noise and passes the first signal band and the second signal band by being resonant with a capacitance present when the first shunt switching circuit is turned off.

The second switching circuit may include a second series switching circuit and a second shunt switching circuit configured to switch the second signal band on and off.

The inductor circuit may include a second inductor device connected between the second shunt switching circuit and a ground, and the second inductor device may suppress noise and pass the first signal band and the second signal band, by being resonant with a capacitance present when the second shunt switching circuit is turned off.

The first inductor device of the inductor circuit may be connected between the second shunt switching circuit and the ground.

The first inductor device of the inductor circuit may suppress a harmonic frequency within at least one band among the first signal band and the second signal band by being resonant with the capacitance present when the first shunt switching circuit is turned off.

The second inductor device of the inductor circuit may suppress a harmonic frequency within at least one band among the first signal band and the second signal band by being resonant with the capacitance present when the second shunt switching circuit is turned off.

In another general aspect, a radio frequency switch apparatus includes a first radio frequency switching circuit comprising an inductor circuit and switching circuits. Each of the switching circuits is configured to switch signal bands from an antenna on and off. Each of the switching circuits is connected between an antenna terminal and a signal terminal, and each of the switching circuits comprises a series switching circuit and a shunt switching circuit configured to switch at least one of the signal bands. A duplexer circuit includes duplexers respectively connected to the switching circuits and configured to pass signal bands through the duplexers. The inductor circuit includes a first inductor device connected between a first shunt switching circuit of the switching circuits and a ground. The first inductor device suppresses noise and passes at least one of the signal bands by being resonant with a capacitance present when the first shunt switching circuit is turned off.

A second switching circuit of the switching circuits may be connected between the antenna terminal and another signal terminal.

The inductor circuit may include a second inductor device connected between a second shunt switching circuit of the switching circuits and a ground, and the second inductor device may suppress noise and pass a first signal band and a second signal band of the signal bands by being resonant with a capacitance present when the second shunt switching circuit is turned off.

The first inductor device may be connected between the shunt switching circuit of each of the switching circuits and the ground.

The first inductor device may suppress a harmonic frequency within at least one band of the signal bands by being resonant with the capacitance present when the first shunt switching circuit is turned off.

The second inductor device may suppress a harmonic frequency within at least one band among the signal bands by being resonant with a capacitance present when the second shunt switching circuit is turned off.

In another general aspect, a radio frequency switch apparatus includes switching circuits connected between respective signal terminals and an antenna terminal. Each of the switching circuits includes a series switching circuit and a shunt switching circuit configured to switch a signal band on and off. An inductor circuit includes an inductor device connected between at least one shunt switching circuit of the switching circuits and a ground. The inductor device suppresses noise and passes the signal band by being resonant with a capacitance present when the shunt switching circuit is turned off.

The inductor device may be connected between each of the switching circuits and a ground.

The shunt switching circuit of each of the switching circuits may be configured to switch a different signal band on and off.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
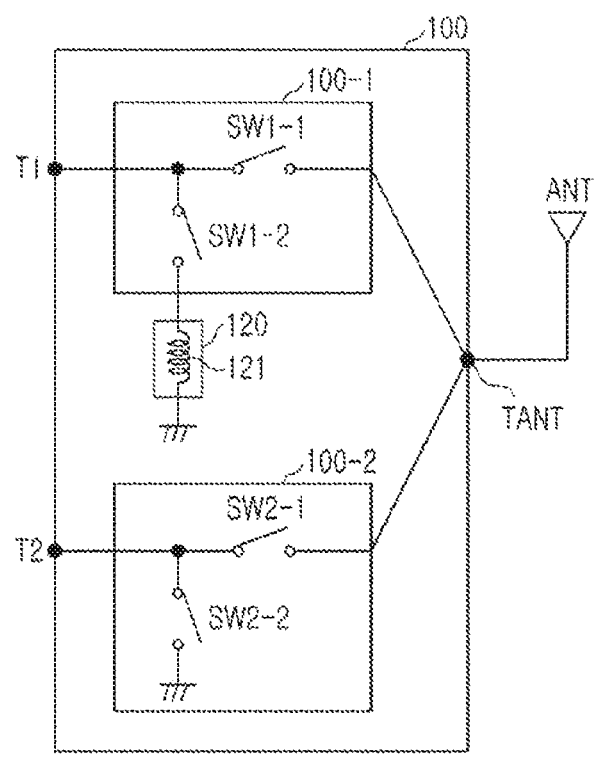
FIG. 1 is a view of a radio frequency switch apparatus according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a view of a radio frequency switch apparatus according to an example.

With reference to FIG. 1, a radio frequency switch apparatus, according to an example, includes a radio frequency switching circuit 100. The radio frequency switching circuit 100 includes a first switching circuit 100-1, a second switching circuit 100-2, and an inductor circuit 120.

The first switching circuit 100-1 is connected between an antenna terminal TANT and a first signal terminal T1, and includes a first series switching circuit SW1-1 and a first shunt switching circuit SW1-2, in order to switch a first signal band SB1 on and off.

The second switching circuit 100-2 is connected between the antenna terminal TANT and a second signal terminal T2, and includes a second series switching circuit SW2-1 and a second shunt switching circuit SW2-2, in order to switch a second signal band SB2, different from the first signal band SB1, on and off.

The inductor circuit 120 includes a first inductor device 121 connected between the first shunt switching circuit SW1-2 and a ground.

A first inductor device 121 of the inductor circuit 120 suppresses noise, except for the first signal band SB1 and the second signal band SB2, by being resonant with the capacitance present when the first shunt switching circuit SW1-2 is turned off.

In each example, noise, a target to be suppressed, may be provided as a harmonic within a single band among a plurality of signal bands, such as a first signal band, a second signal band, or the like.

Figure 2:
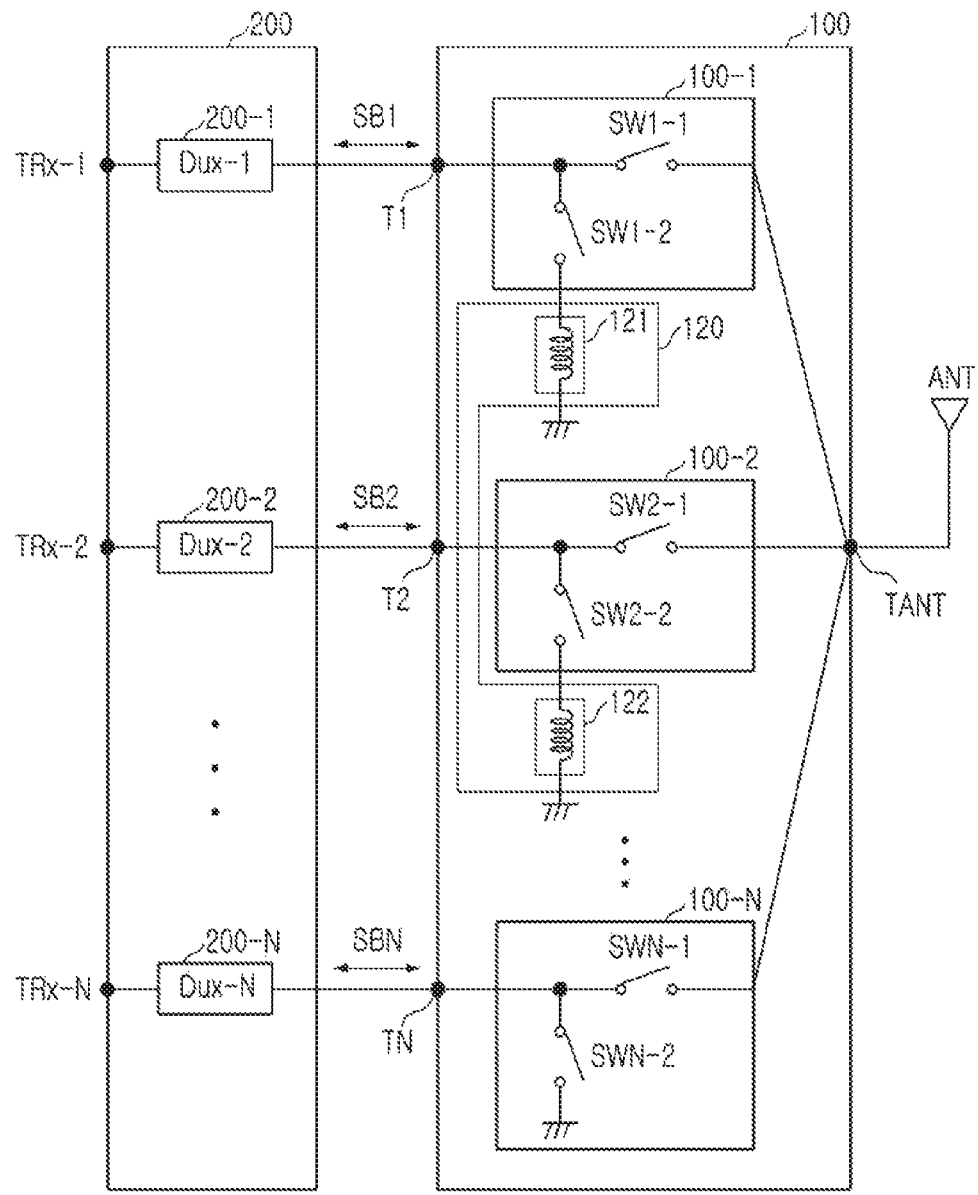
FIG. 2 is a view of a radio frequency switch apparatus according to another example.

FIG. 2 is view of a radio frequency switch apparatus according to another example.

With reference to FIG. 2, the radio frequency switch apparatus includes a first radio frequency switching circuit 100 and a duplexer circuit 200.

The first radio frequency switching circuit 100 includes a first switching circuit 100-1 to an nth switching circuit 100-N, switching a first signal band to an nth signal band from an antenna ANT on and off.

The first switching circuit 100-1 is connected between the antenna terminal TANT and a first signal terminal T1 and includes a first series switching circuit SW1-1 and a first shunt switching circuit SW1-2, in order to switch a first signal band SB1 on and off.

A second switching circuit 100-2 is connected to the antenna terminal TANT and a second signal terminal T2, and includes a second series switching circuit SW2-1 and a second shunt switching circuit SW2-2, in order to switch a second signal band SB2 on and off.

The nth switching circuit 100-N is connected between the antenna terminal TANT and an nth signal terminal TN, and includes an nth series switching circuit SWN-1 and an nth shunt switching circuit SWN-2, in order to switch an nth signal band SBN on and off.

The duplexer circuit 200 includes a first duplexer 200-1 to an nth duplexer 200-N.

The first duplexer 200-1 is connected to the first switching circuit 100-1 between the first signal terminal T1, and a first transmitting and receiving terminal TRx-1 allows the first signal band SB1 to pass therethrough.

A second duplexer 200-2 is connected to the second switching circuit 100-2 between the second signal terminal T2, and a second transmitting and receiving terminal TRx-2 allows the second signal band SB2 to pass therethrough.

In addition, the nth duplexer 200-N is connected to the nth switching circuit 100-N between the nth signal terminal TN, and an nth transmitting and receiving terminal TRx-N allows the nth signal band SBN to pass therethrough.

An inductor circuit 120 includes a first inductor device 121 connected between the first shunt switching circuit SW1-2 and the ground. The first inductor device 121 of the inductor circuit 120 suppresses noise, except for a first signal band and a second signal band, by being resonant with the capacitance present when the first shunt switching circuit SW1-2 is turned off.

The inductor circuit 120 includes a second inductor device 122 connected between the second shunt switching circuit SW2-2 and the ground. The second inductor device 122 suppresses noise, except for the first signal band and the second signal band, by being resonant with the capacitance present when the second shunt switching circuit SW2-2 is turned off.

In an example, in a case in which a resonant frequency of the first inductor device 121 and a resonant frequency of the second inductor device 122 are set to be a second harmonic within a relevant signal band, characteristics to suppress the second harmonic within the relevant signal band are further improved. Alternatively, in a case in which the resonant frequency of the first inductor device 121 is set to be the second harmonic within the relevant signal band, and the resonant frequency of the second inductor device 122 is set to be a third harmonic within a relevant signal band, characteristics to suppress the second harmonic and the third harmonic within the relevant signal band are improved.

Figure 3:
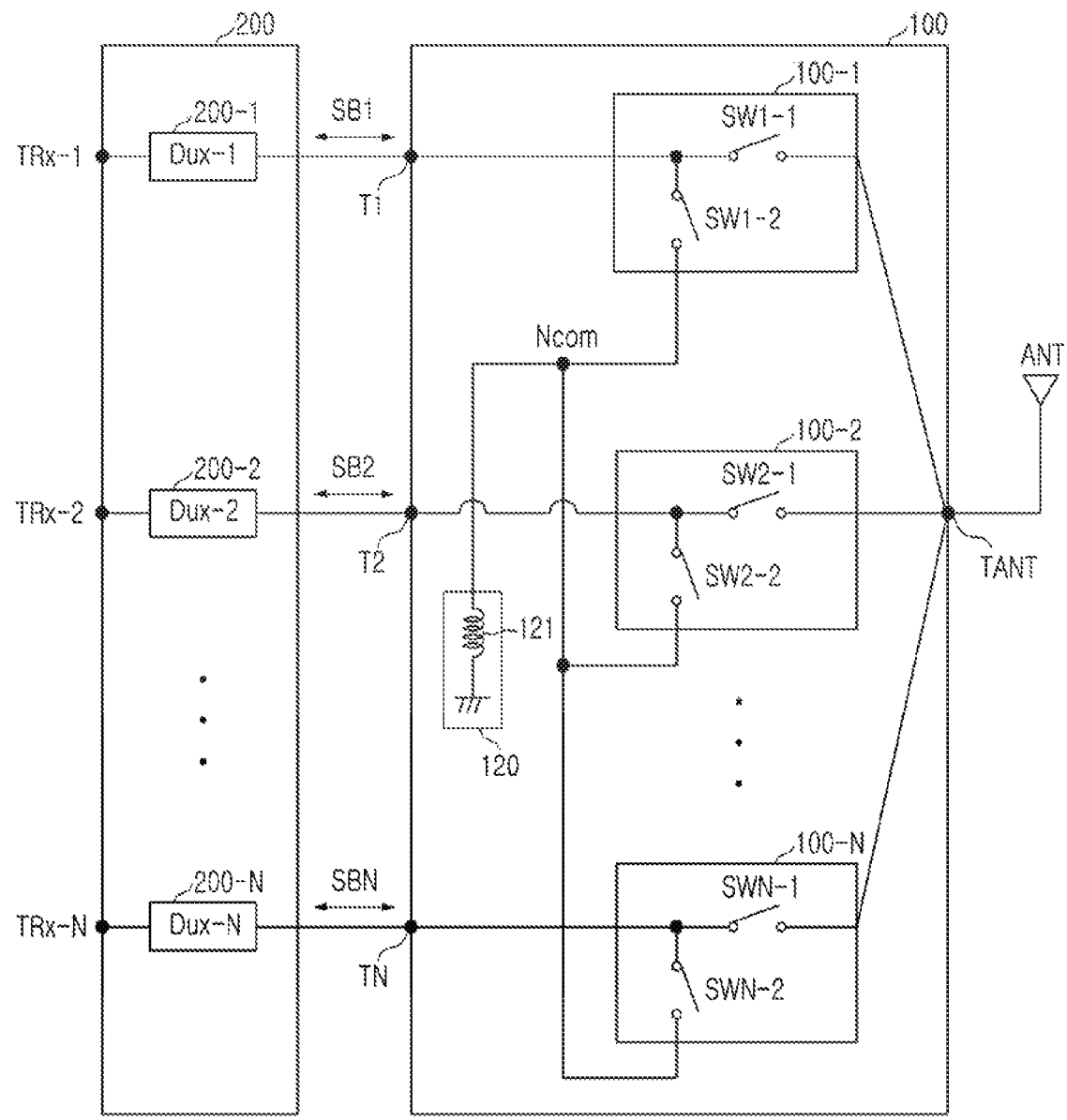
FIG. 3 is a view of a radio frequency switch apparatus according to another example.

FIG. 3 is view of a radio frequency switch apparatus according to another example.

With reference to FIG. 3, a radio frequency switch apparatus includes a first radio frequency switching circuit 100 and a duplexer circuit 200.

The first radio frequency switching circuit 100 includes a first switching circuit 100-1 to an nth switching circuit 100-N, switching a first signal band to an nth signal band from an antenna ANT on and off.

The first switching circuit 100-1 is connected between an antenna terminal TANT and a first signal terminal T1, and includes a first series switching circuit SW1-1 and a first shunt switching circuit SW1-2, in order to switch a first signal band SB1 on and off.

The second switching circuit 100-2 is connected between the antenna terminal TANT and a second signal terminal T2, and includes a second series switching circuit SW2-1 and a second shunt switching circuit SW2-2, in order to switch a second signal band SB2 on and off.

The nth switching circuit 100-N is connected between the antenna terminal TANT and an nth signal terminal TN, and includes an nth series switching circuit SWN-1 and an nth shunt switching circuit SWN-2, in order to switch an nth signal band SBN on and off.

The duplexer circuit 200 includes a first duplexer 200-1 to an nth duplexer 200-N.

The first duplexer 200-1 is connected to the first switching circuit 100-1, between the first signal terminal T1 and a first transmitting and receiving terminal TRx-1, and allows the first signal band SB1 to pass therethrough.

A second duplexer 200-2 is connected to the second switching circuit 100-2, between the second signal terminal T2 and a second transmitting and receiving terminal TRx-2, and allows the second signal band SB2 to pass therethrough.

In addition, the nth duplexer 200-N is connected to the nth switching circuit 100-N, between the nth signal terminal TN and an nth transmitting and receiving terminal TRx-N, and allows the nth signal band SBN to pass therethrough.

An inductor circuit 120 includes the first inductor device 121 connected between a common access node Ncom of the first shunt switching circuit SW1-2, the second shunt switching circuit SW2-2, and the nth shunt switching circuit SWN-2 and a ground.

The first inductor device 121 of the inductor circuit 120 suppresses a harmonic frequency within at least one band among the first signal band, the second signal band, and the nth signal band by being resonant with the capacitance present when a relevant shunt switching circuit is turned off among the first shunt switching circuit SW1-2, the second shunt switching circuit SW2-2, and the nth shunt switching circuit SWN-2.

Figure 4:
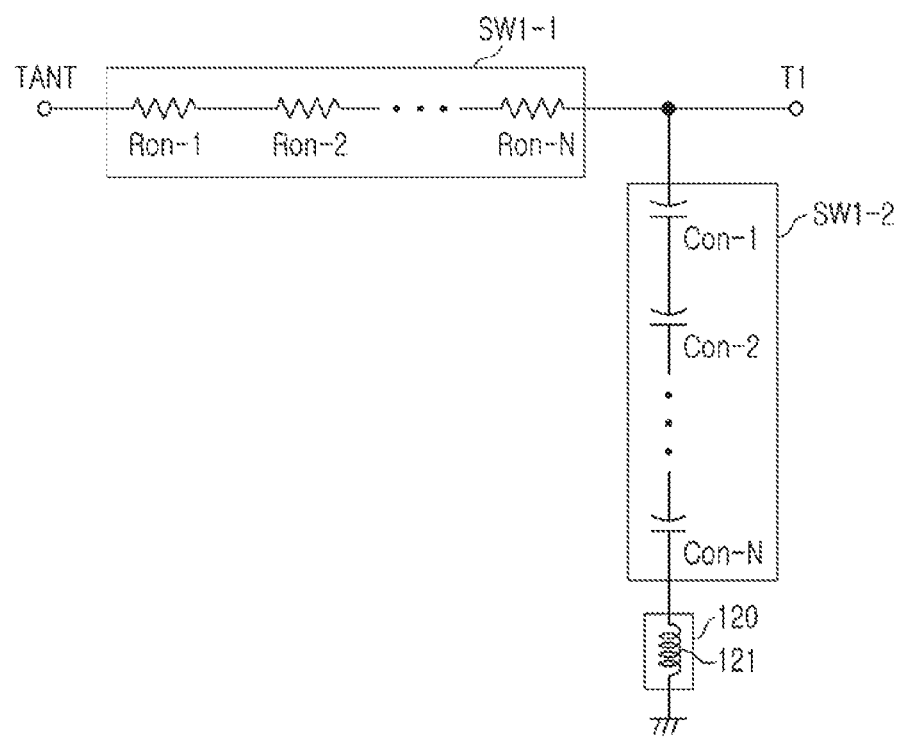
FIG. 4 is an equivalent circuit diagram illustrating a state in which a first switching circuit is turned on according to an example.
Figure 5:
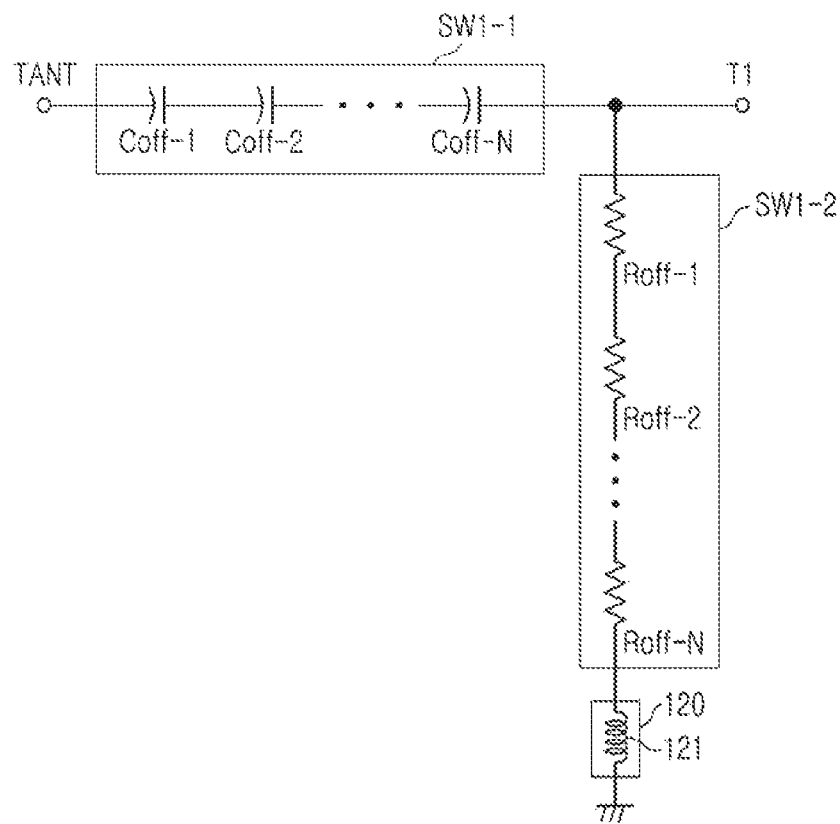
FIG. 5 is an equivalent circuit diagram illustrating a state in which a first switching circuit of FIG. 4 is turned off.

FIG. 4 is an equivalent circuit diagram illustrating a state in which a first switching circuit is turned on, according to an example, while FIG. 5 is an equivalent circuit diagram illustrating a state in which the first switching circuit in FIG. 4 is turned off.

FIGS. 4 and 5 illustrate equivalent circuit diagrams of a case in which a radio frequency switch apparatus is provided as a single pole single throw (SPST) switch. Each of a first series switching circuit SW1-1 and a first shunt switching circuit SW1-2 includes n transistors connected in series.

FIG. 4 is an equivalent circuit diagram illustrating a state in which a first switching circuit 100-1 is turned on. In a case in which the first switching circuit 100-1 includes a first series switching circuit SW1-1 and a first shunt switching circuit SW1-2, an entirety of n transistors of the first series switching circuit SW1-1 are turned on, so that n transistors are marked as resistance Ron-1 to Ron-N in an equivalent circuit. In addition, an entirety of n transistors of the first shunt switching circuit SW1-2 are turned off, so that n transistors are marked as capacitors Con-1 to Con-N in an equivalent circuit.

Thus, a first signal band SB1 is passed by the first switching circuit 100-1.

FIG. 5 is an equivalent circuit diagram illustrating a state in which the first switching circuit 100-1 is turned off. In a case in which the first switching circuit 100-1 includes the first series switching circuit SW1-1 and the first shunt switching circuit SW1-2, the entirety of n transistors of the first series switching circuit SW1-1 are turned off, so that n transistors are marked as capacitors Coff-1 to Coff-N in the equivalent circuit. In addition, the entirety of n transistors of the first shunt switching circuit SW1-2 are turned on, so that n transistors are marked as resistance Roff-1 to Roff-N in the equivalent circuit.

Thus, the first signal band SB1 is blocked by the first switching circuit 100-1.

As described above, with reference to FIG. 4, in a case in which the first switching circuit 100-1 is turned on, n transistors of the first series switching circuit SW1-1 are turned on, so that n transistors are marked as resistance Ron-1 to Ron-N in an equivalent circuit. Furthermore, the entirety of n transistors of the first shunt switching circuit SW1-2 are turned off, n transistors are marked as capacitors Con-1 to Con-N in an equivalent circuit.

In a case in which the entirety of n transistors of the first shunt switching circuit SW1-2 are turned off, the capacitance present in an equivalent circuit is resonant with inductance of the first inductor device 121 of the inductor circuit 120. In an example, since impedance is substantially 0 in a resonant frequency, in a case in which the resonant frequency is set to be a harmonic within a first signal band, the harmonic within the first signal band is bypassed to a ground, thereby suppressing the harmonic within the first signal band.

Figure 6:
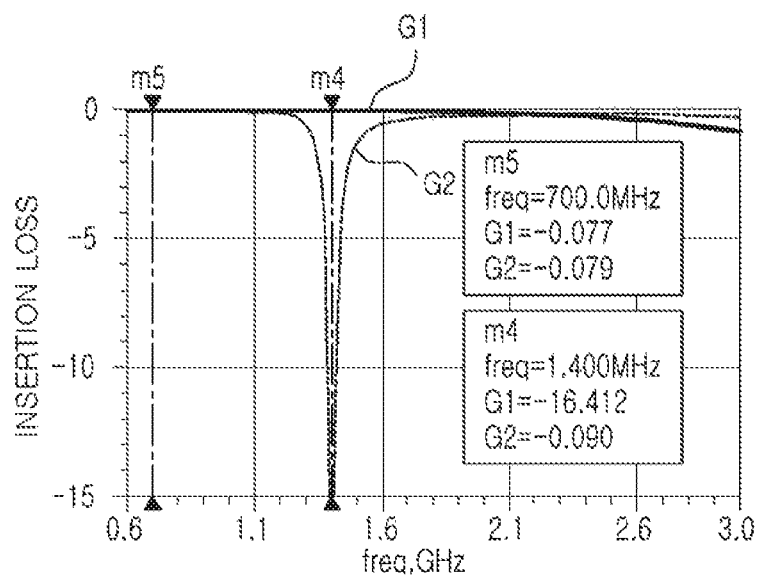
FIG. 6 is a view illustrating frequency characteristics of a radio frequency switch apparatus according to an example.

FIG. 6 is a view illustrating frequency characteristics of a radio frequency switch apparatus according to an example.

G1 and G2 illustrated in FIG. 6 are graphs illustrating frequency characteristics of a first signal band having a center frequency of 700 MHz. G1 is a graph illustrating frequency characteristics of a radio frequency switch apparatus of some communications system, while G2 is a graph illustrating frequency characteristics of a radio frequency switch apparatus of an example.

With reference to G1, since the radio frequency switch apparatus of some communications system does not include a component changing harmonic attenuation performance, a harmonic is not attenuated.

However, with reference to G2, the radio frequency switch apparatus, according to an example, illustrates attenuation performance of a second harmonic of 700 MHz. In other words, with reference to G2, it can be confirmed that attenuation characteristics of 1.4 GHz of the second harmonic of 700 MHz, the center frequency is improved to be higher than the graph of G1 by 15 dB or more. In an example, a difference between degradation of insertion loss in a passband, according to a resonant frequency and degradation before an inductor is inserted, is 0.002 dB, an insignificant amount.

As set forth above, according to the examples, noise, such as a harmonic of a specific frequency (a second harmonic or a third harmonic) may be suppressed. A harmonic of a desired transmitting and receiving band, among a plurality of transmitting and receiving bands, may also be suppressed.

In addition, since a capacitor and an inductor are typically required in a resonant circuit, a switch that is turned off may be used instead of a capacitor; thus, a resonant circuit may be formed by adding only the inductor, which reduces space and unit cost.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radio frequency switch apparatus, comprising:
a first switching circuit connected between an antenna terminal and a first signal terminal, comprising a first series switching circuit and a first shunt switching circuit configured to switch a first signal band on and off;
a second switching circuit connected between the antenna terminal and a second signal terminal, configured to switch a second signal band, different from the first signal band, on and off; and an inductor circuit comprising a first inductor device connected between the first shunt switching circuit and a ground, wherein the first inductor device suppresses noise, except for the first signal band and the second signal band, by being resonant with a capacitance present upon the first shunt switching circuit being turned off.

2. The radio frequency switch apparatus of claim 1, wherein the second switching circuit comprises a second series switching circuit and a second shunt switching circuit configured to switch the second signal band on and off.

3. The radio frequency switch apparatus of claim 2, wherein the inductor circuit comprises a second inductor device connected between the second shunt switching circuit and a ground, and the second inductor device suppresses noise and passes the first signal band and the second signal band, by being resonant with a capacitance present when the second shunt switching circuit is turned off.

4. The radio frequency switch apparatus of claim 3, wherein the second inductor device of the inductor circuit suppresses a harmonic frequency within at least one band among the first signal band and the second signal band by being resonant with the capacitance present upon the second shunt switching circuit being turned off.

5. The radio frequency switch apparatus of claim 2, wherein the first inductor device of the inductor circuit is connected between the second shunt switching circuit and the ground.

6. The radio frequency switch apparatus of claim 1, wherein the first inductor device of the inductor circuit suppresses a harmonic frequency within a band among the first signal band and the second signal band by being resonant with the capacitance present upon the first shunt switching circuit being turned off.

7. A radio frequency switch apparatus, comprising:
a first radio frequency switching circuit comprising an inductor circuit and switching circuits, wherein each of the switching circuits is configured to switch signal bands from an antenna on and off, is connected between an antenna terminal and a signal terminal, is comprising a series switching circuit and a shunt switching circuit configured to switch at least one of the signal bands; and
a duplexer circuit, comprising duplexers respectively connected to the switching circuits configured to pass signal bands through the duplexers,
wherein the inductor circuit comprises a first inductor device connected between a first shunt switching circuit of the switching circuits and a ground, and configured to suppress noise, except for one or both of the signal bands, by being resonant with a capacitance present upon the first shunt switching circuit being turned off.

8. The radio frequency switch apparatus of claim 7, wherein a second switching circuit of the switching circuits is connected between the antenna terminal and another signal terminal.

9. The radio frequency switch apparatus of claim 8, wherein the inductor circuit comprises a second inductor device connected between a second shunt switching circuit of the switching circuits and a ground, and configured to suppress noise, except for a first signal band and a second signal band of the signal bands, by being resonant with a capacitance present upon the second shunt switching circuit being turned off.

10. The radio frequency switch apparatus of claim 8, wherein the first inductor device is connected between the shunt switching circuit of each of the switching circuits and the ground.

11. The radio frequency switch apparatus of claim 8, wherein the second inductor device suppresses a harmonic frequency within at least one band among the signal bands by being resonant with a capacitance present upon the second shunt switching circuit being turned off.

12. The radio frequency switch apparatus of claim 7, wherein the first inductor device suppresses a harmonic frequency within a band of the signal bands by being resonant with the capacitance present upon the first shunt switching circuit being turned off.

13. A radio frequency switch apparatus, comprising:
switching circuits each connected between a signal terminal and an antenna terminal, and comprising a series switching circuit and a shunt switching circuit configured to switch a signal band on and off; and
an inductor circuit comprising an inductor device connected between a shunt switching circuit of the switching circuits and a ground,
wherein the inductor device suppresses noise and passes the signal band by being resonant with a capacitance present upon the shunt switching circuit being turned off.

14. The radio frequency switch apparatus of claim 13, wherein the inductor device is connected between each of the switching circuits and a ground.

15. The radio frequency switch apparatus of claim 13, wherein the shunt switching circuit is configured to switch a different signal band on and off.

* * * * *